United States Patent [19]

Matsushita

[11] Patent Number: 4,489,260

[45] Date of Patent: Dec. 18, 1984

[54] METHOD OF DRIVING A STEPPING MOTOR AND A DRIVE CIRCUIT THEREOF

[75] Inventor: Tsuyoshi Matsushita, Shizuoka, Japan

[73] Assignee: Tokyo Electric Co., Ltd., Tokyo, Japan

[21] Appl. No.: 508,494

[22] Filed: Jun. 27, 1983

[30] Foreign Application Priority Data

Jan. 20, 1983 [JP] Japan .................................... 58/7705

[51] Int. Cl.³ ............................................ H02K 29/04
[52] U.S. Cl. ..................................... 318/696; 318/685
[58] Field of Search ............................... 318/696, 685

[56] References Cited

U.S. PATENT DOCUMENTS 4,156,170  5/1979  Strunc .................................. 318/696

*Primary Examiner*—J. V. Truhe
*Assistant Examiner*—Saul M. Bergmann
*Attorney, Agent, or Firm*—Frishauf, Holtz, Goodman and Woodward

[57] ABSTRACT

A motor drive circuit includes ROM in which a plurality of driving speed patterns are stored, a RAM for storing step data indicative of the number of driving rotational steps, and a data processing circuit for supplying motor driving data to a motor control unit in accordance with one of the driving speed patterns selected on the basis of the step data in the RAM. A series of step timing data is included in each of the driving speed patterns. The data processing circuit sequentially reads out the series of step timing data related to the selected driving speed pattern from the ROM and supplies the motor driving data to the motor control unit each time the period of time corresponding to this read-out step timing data elapses.

2 Claims, 7 Drawing Figures

| | |
|---|---|
| [X1] | Y1 |
| [X2] | Y2 |
| ⋮ | ⋮ |
| [Xi] | Yi |
| ⋮ | ⋮ |
| [Xn] | Yn |
| [Y1+1] | ST1−X1 |
| [Y1+2] | ST1−(X1−1) |
| ⋮ | ⋮ |
| [Y1+X1−1] | ST1−2 |
| [Y1+X1] | ST1−1 |
| ⋮ | ⋮ |
| [Yi+1] | STi−Xi |
| [Yi+2] | STi−(Xi−1) |
| ⋮ | ⋮ |
| [Yi+Xi−1] | STi−2 |
| [Yi+Xi] | STi−1 |
| ⋮ | ⋮ |
| [Yn+1] | STn−Xn |
| [Yn+2] | STn−(Xn−1) |
| ⋮ | ⋮ |
| [Yn+Xn−1] | STn−2 |
| [Yn+Xn] | STn−1 |

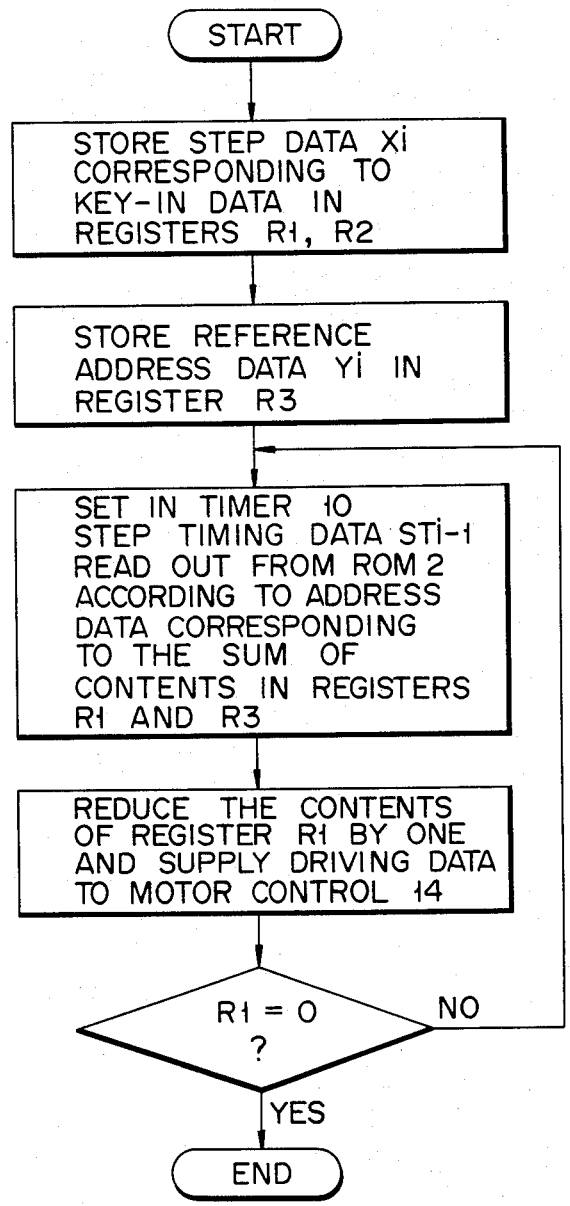

4,489,260

METHOD OF DRIVING A STEPPING MOTOR AND A DRIVE CIRCUIT THEREOF

BACKGROUND OF THE INVENTION

This invention relates to a method of driving a stepping motor and a drive circuit thereof.

It is known that a printing wheel of a wheel printer is driven by a stepping motor. In this case, for example, a memory in which the acceleration and deceleration patterns of the stepping motor are stored is used. A central processing unit (CPU) designates the address location of the memory, in which the acceleration pattern is stored, in accordance with step amount data indicative of the number of rotational steps specified by the key operation, and the CPU reads out from this memory step timing data representative of the step timings which gradually become faster. The step timing data read out from this memory is input to a programmable timer, which generates step timing signal when the period corresponding to this step timing data has elapsed. The CPU drives a stepping motor drive circuit synchronously with the step timing signal to drive the stepping motor by one step. Thereafter, when the step timing data reaches a predetermined value, namely, when the step driving frequency of the stepping motor reaches a predetermined value, the stepping motor is driven step by step in accordance with this predetermined step driving frequency. In this case, the stepping motor is diven on the basis of this predetermined step driving frequency, that is, at a constant rotational speed until the number of residual rotational steps to be driven reaches a preset value. Thereafter, when the number of residual rotational steps reaches the preset value, the CPU reads out the step timing data indicative of the deceleration pattern from the memory, thereby step-driving the motor on the basis of this step timing data while reducing the step driving frequency. In this way, the stepping motor is step-driven at a gradually decreasing speed, and is stopped when it is driven by the number of rotational steps which has been originally specified.

The driving method will be described with reference to FIG. 1, in the case where the stepping motor is step-driven by the predetermined number of rotational steps N1, N2 and N3 (N1>N2>N3) selected by the key input.

When the motor is step-driven by the predetermined number of rotational steps N1, the rotational speed gradually increases along the acceleration pattern A-B-C. After the step driving frequency reaches the predetermined value F1, the stepping motor is driven on the basis of this step driving frequency F1 until the number of residual rotational steps to be driven reaches N. When the number of residual rotational steps reaches N, the stepping motor is step-driven at such a rate that the rotational speed gradually decreases along the deceleration pattern D-E.

When the number of rotational steps is set to N2 or N3, the motor is step-driven at such a rate that the rotational speed gradually increases along the acceleration pattern A-B-C or A-B until the number of rotational steps becomes, for example, N2/2 or N3/2. Thereafter, the motor is step-driven at such a rate that the rotational speed gradually decreases along the deceleration pattern C-F or B-G.

In the case of such a prior-art stepping motor driving method, the stepping motor is always step-driven on the basis of the same acceleration and deceleration patterns irrespective of the number of rotational steps to be driven; therefore, it is difficult to smoothly drive the stepping motor. Particularly, in the case where the number of rotational steps is a small value, overshoot or the like may easily occur and it is difficult to accurately drive the motor.

SUMMARY OF THE INVENTION

An object of the present invention is to provide a method and a circuit of driving a stepping motor step by step on the basis of the optimum speed pattern in accordance with a predetermined number of rotational steps to be driven.

The above object is accomplished by a stepping motor driving circuit comprising a first memory device in which a plurality of drive speed patterns each including a series of step timing data are stored, a second memory device for storing data indicative of the number of rotational steps to be driven, a motor driving device, and a data processing circuit which selects one of the driving speed patterns in accordance with the data indicative of the number of driving rotational steps stored in the second memory device and sequentially reads out a series of step timing data of the driving speed pattern selected from the first memory device, and which supplies the motor driving data to the motor driving device whenever the time period corresponding to the step timing data which has been sequentially read out elapses.

In the present invention, the optimum driving speed pattern is selected in accordance with the number of rotational steps to be driven, so that the stepping motor can be promptly and precisely driven.

BRIEF DESCRIPTION OF THE DRAWINGS

FIG. 5 is a flowchart showing the operation of the drive circuit shown in FIG. 2;

DETAILED DESCRIPTION OF THE PREFERRED EMBODIMENTS

Figure 2:
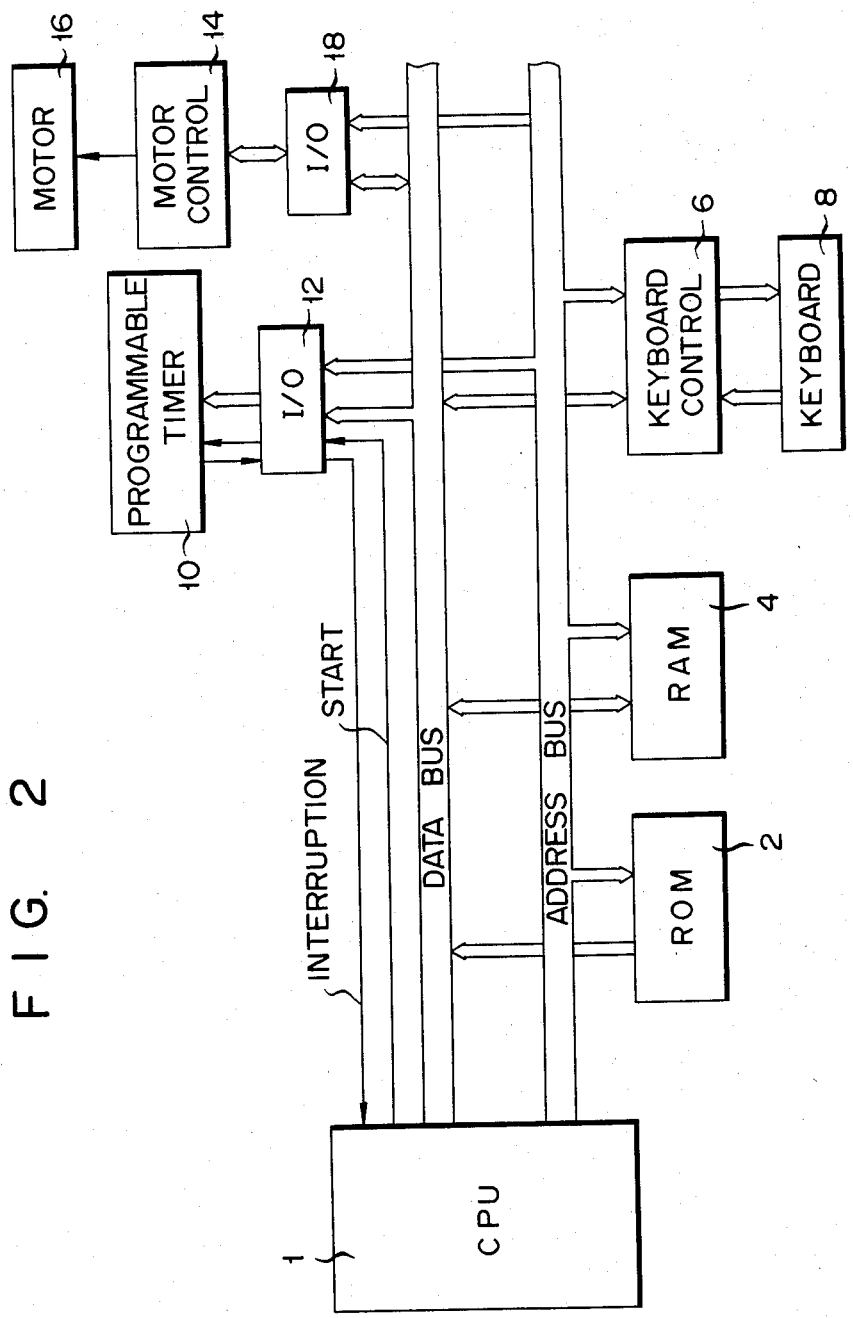
FIG. 2 is a circuit diagram of a stepping motor drive circuit in an embodiment of the present invention.

FIG. 2 shows a block diagram of a stepping motor drive circuit in an embodiment of the present invention This drive circuit includes a central processing unit (CPU) 1, a read only memory (ROM) 2 and a random access memory (RAM) 4 which are connected to the CPU 1, a keyboard control unit 6 for transmitting a key signal, which is indicative of the number of rotational steps of the motor and is generated by means of a keyboard 8, to the CPU 1, a programmable timer 10 to which time data indicative of the number of rotational steps generated from the CPU 1 is set through an I/O port 12, and a motor control unit 14 for driving a motor 16 to drive a printing wheel step by step in response to a drive signal sent from the CPU 1 through an I/O port 18.

Figures 3, 4:
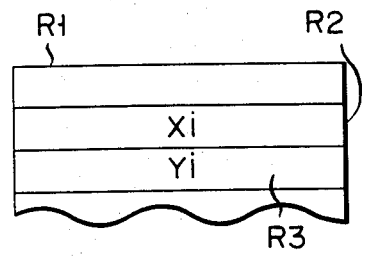
FIGS. 3 and 4 respectively show the memory maps of the ROM and RAM used in the drive circuit shown in FIG. 2.

FIGS. 3 and 4 respectively shows parts of the memory maps of the ROM 2 and RAM 4 shown in FIG. 2. This ROM 2 stores n speed pattern tables each having head addresses [Y1+1] to [Yn+1] which are respectively specified in accordance with step data X1 to Xn indicative of the numbers of rotational steps of the stepping motor 16, and address tables having address data Y1 to Yn corresponding to step data X1 to Xn. Each speed pattern table has Xi address locations to be designated by the addresses [Yi+1] to [Yi+Xi]. Xi step timing data (STi−Xi) to (STi−1) are stored in the Xi address locations, respectively. The RAM 4 includes a register R1, a register R2 in which step data Xi representative of the number of rotational steps of the motor specified by operation of the keyboard 8 is stored, and a register R3 in which address data Yi corresponding to the step data Xi stored in the register R2 is stored.

The operation of the motor drive circuit shown in FIG. 2, now will be described with reference to the flowchart shown in FIG. 5. First, in response to the operation of the keyboard 8, the CPU 1 sets in the registers R1 and R2 the step data Xi corresponding to the key-in data representative of the number of rotational steps. Next, the CPU 1 designates the address location [Xi] in the ROM 2 in accordance with the step data Xi stored in the register R2 as an address signal. Then, the CPU 1 reads out reference address data Yi from this address location [Xi]. This reference address data Yi read out from the ROM 2 is stored in the register R3. Thereafter, the CPU 1 adds the data Xi and Yi stored in the registers R1 and R3 and designates the address location [Yi+Xi] in the ROM 2 using the added data [Xi+Yi] as an address signal. Thus, the step timing data STi−1 is read out from the ROM 2 and set into the programmable timer 10 through the I/O port 12. This programmable timer 10 starts counting the time corresponding to the step timing data STi−1 in response to a count start signal generated from the CPU 1 at the same time or immediately after the step timing data STi−1 has been set. After the programmable timer 10 has counted the predetermined period of time corresponding to the step timing data STi−1, it supplies an interruption signal to the interruption terminal INT of the CPU 1. The CPU 1 subtracts one from the contents of the register R1 in response to the interruption signal and supplies the driving data to the motor control unit 14 to allow the motor control unit 14 to generate a drive signal, thereby driving and revolving the motor 16 by one step or a predetermined angle of rotation.

After the motor 16 has been step-driven, the CPU 1 checks whether or not the content of the register R1 is "0". If it is detected that the content of the register R1 is not "0", data (Xi−1) and Yi stored in the registers R1 and R3 are added and the address location [Yi+Xi−1] in the ROM 2 is designated by the added data (Yi+Xi−1) used as an address signal. Hence, step timing data STi−2 is read out from the ROM 2 and set into the programmable timer 10. When the programmable timer 10 has counted the period of time corresponding to the step timing data STi−2, it generates in interruption signal. The CPU 1 then subtracts one from the content of the register R1 in response to the interruption signal for allowing the stepping motor 16 to be step-driven by one rotational step.

In the same way as described above, the stepping motor 16 is step-driven on a one-rotational step basis, and the content of the register R1 is sequentially subtracted one by one. After the stepping motor 16 has been step-driven by (Xi−1) rotational steps, in other words, when the (Xi−1)th rotational step has been finished, data "1" is stored in the register R1, and the step timing data STi−1 is read out from the address location [Yi+1] in the ROM 2 in the same manner as described above. After the corresponding period of time has elapsed, data "0" is stored in the register R1 and the stepping motor 16 is step-driven. Thereafter, when it is detected that the content of the register R1 is "0", that is, when the motor 16 has been step-driven by the number of rotational steps specified by the keyboard 8 at this time, the sequential step-driving of the stepping motor is now completed.

Figure 1:
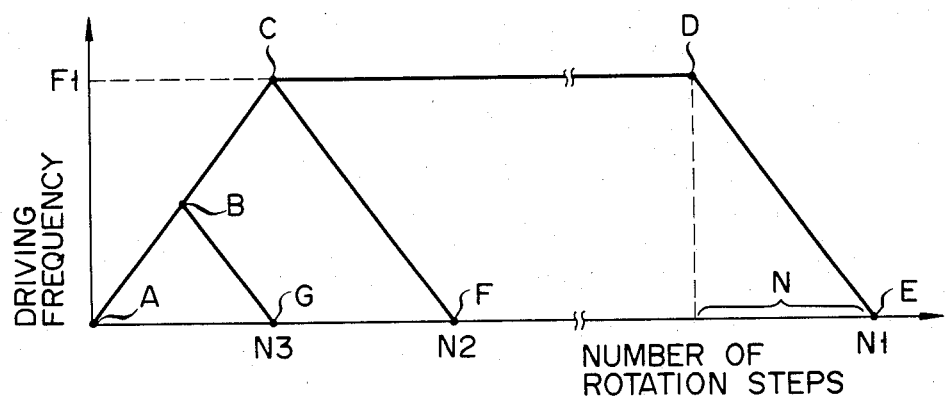
FIG. 1 shows driving speed patterns used in a prior-art stepping motor driving method.
Figure 6:
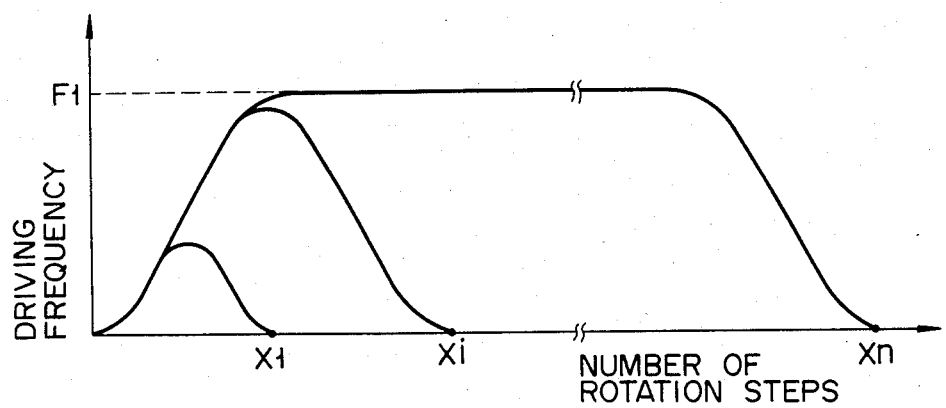
FIG. 6 shows the driving speed pattern obtained by the drive circuit shown in FIG. 2.

As described above, according to the present invention, the speed patterns corresponding to the number of rotational steps specified are stored in the ROM 2. Therefore, as shown in FIG. 6, the motor 16 can be step-driven along the optimum speed pattern selected in accordance with the number of rotational steps, so that the motor can be promptly and accurately driven step by step without causing any overshoot or the like.

Figure 7:
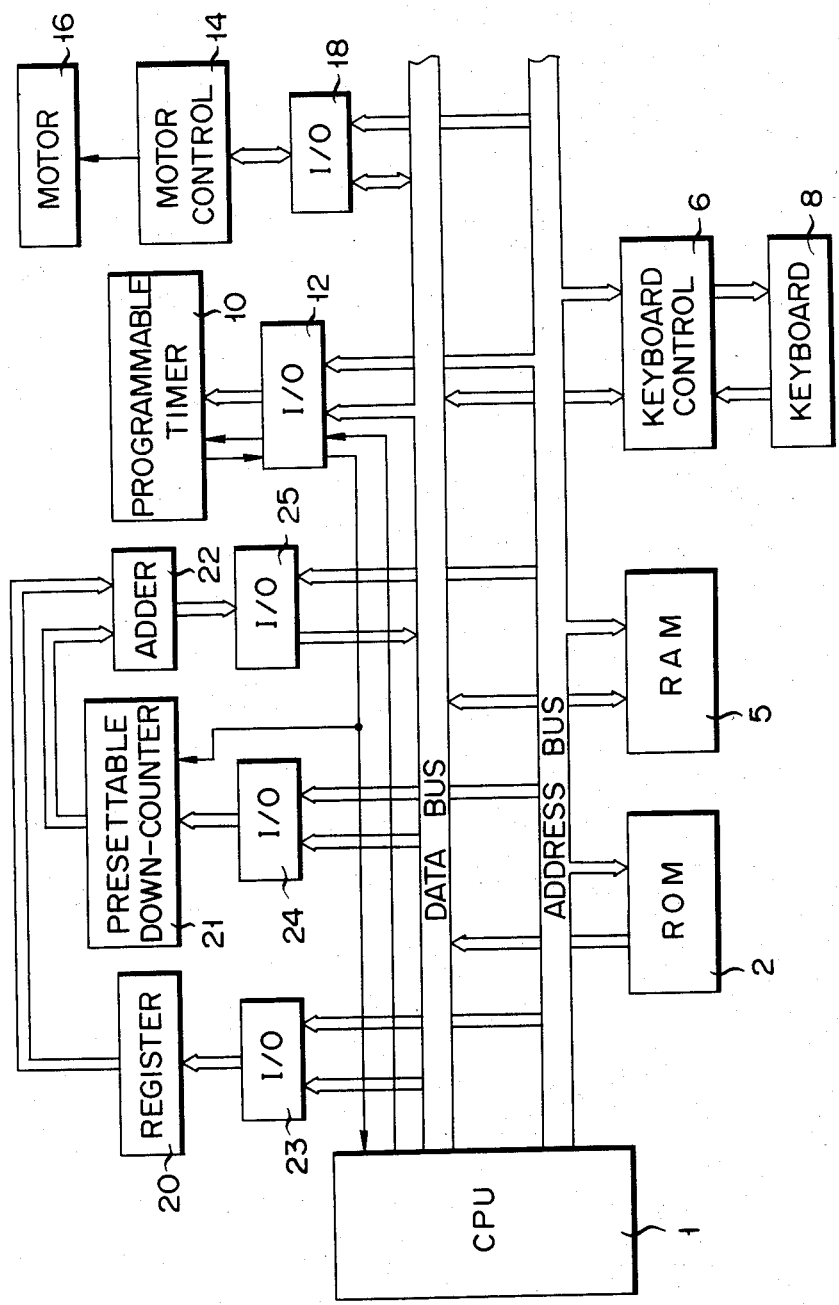
FIG. 7 is a circuit diagram of a motor drive circuit in another embodiment of the present invention.

FIG. 7 shows a motor drive circuit according to another embodiment of the present invention. According to this motor drive circuit, a RAM 5 which does not have the registers R1 and R3 of the RAM 4 is used, and a register 20, a presettable down-counter 21 and an adder 22 are connected to the CPU 1 through I/O ports 23 to 25, respectively.

The motor drive circuit shown in FIG. 7 fundamentally operates in a similar fashion to that shown in FIG. 2. Namely, the CPU 1 sets, in the register R2 of the RAM 4, the step data Xi corresponding to the number of rotational steps specified in response to the key operation of the keyboard 8 and then sets the step data Xi into the presettable down-counter 21. Then, the CPU 1 reads out the reference address data Yi from the ROM 2 using the step data Xi stored in the register 2 as an address signal and sets the reference address data Yi in the register 20. The contents of the register 20 and down-counter 21 are added by the adder 22. The CPU 1 reads out the step timing data STi−1 from the ROM 2 using the output data (Xi+Yi) from the adder 22 as an address signal and sets the step timing data into the programmable timer 10. When the time period corresponding to the step timing data STi−1 has been counted, the down-counter 21 decreases the count value by one in response to the interruption signal generated from the programmable timer 10, and the CPU 1 supplies the driving data to the motor control unit 14 to drive the motor 16 by one step. In a manner as described above, step timing data STi−2 to STi−Xi are read out from the ROM 2 in response to address data [Yi+Xi−1] to [Yi+1], which are arranged so as to be sequentially smaller, and to be generated from the adder 22, so that the motor 16 is step-driven on the basis of these step timing data.

When it is detected that the content of the down-counter 21 has become "0", namely, when it is detected that the output data of the adder 22 has become Yi, the sequential steps of driving the motor are completed.

The present invention has been described with respect to particular embodiments. However, the invention is not limited to only these embodiments. For example, in the above embodiments, the content of the register R1 or counter 21 is reduced by one each time the interruption signal is generated from the programmable timer 10. However, it is also possible to complete the sequential steps of driving the motor when the content of the register R1 or counter 21 equals $(Y_i+X_i+1)$ by first setting data $(Y_i+1)$ in the register R1 or counter 21 and increasing the content of the register R1 or counter 21 one by one. In this case, the step timing data $ST_i-1$ to $ST_i-X_i$ must be reversely arranged.

What is claimed is:

1. A stepping motor drive circuit comprising:

first memory means for storing a plurality of driving speed patterns each having a reference address and a series of step timing data;

second memory means for storing step data indicative of the number of driving rotational steps;

said first memory means including a memory area having address locations for storing address data indicative of the respective reference addresses of said driving speed patterns, the address locations being designated by said step data which is stored in said second memory means;

motor driving means; and data processing circuit means including means for selecting one of said driving speed patterns on the basis of the step data stored in said second memory means; means for sequentially reading out the series of step timing data related to said selected driving speed pattern from said first memory means; time counting means for generating an output signal when a time period corresponding to timing data set therein has elapsed; and data processing means for supplying motor driving data to said motor driving means each time a period of time corresponding to the step timing data sequentially read out elapses;

said data processing means including:

means for supplying said motor driving data to said motor driving means in response to the output signal from said time counting means;

means for reading out the next step timing data from said first memory means and for setting said step timing data into said time counting means;

third memory means for storing the address data read out from said first memory means; and fourth memory means whose contents are sequentially changed in a single direction each time said output signal is generated from said time counting means;

said reading out means of said data processing means reading out the corresponding next step timing data from said first memory means using the sum of the contents in said third and fourth memory means as an address signal.

2. A method of driving a stepping motor comprising the steps of:

storing a plurality of driving speed patterns in a first memory, each driving speed pattern having a reference address and a series of step timing data;

selecting one of said stored driving speed patterns corresponding to data indicative of the number of driving rotational steps;

operating a time counter for counting a time period corresponding to step timing data set in the time counter and generating a counting completion signal when said time period has elapsed;

sequentially changing the contents of a second memory in a single direction each time a counting completion signal is generated from said timer counter;

reading out the corresponding next step timing data in response to a counting completion signal using the sum of the contents of said second memory and the reference address as an address signal; and step-driving the stepping motor with a timing determined on the basis of said step timing data read out from said first memory.

* * * * *